(12) United States Patent
Honda et al.

(10) Patent No.: US 7,673,612 B2
(45) Date of Patent: Mar. 9, 2010

(54) ENGINE CONTROL APPARATUS AND ENGINE CONTROL METHOD

(75) Inventors: Hiroyasu Honda, Toyota (JP); Masaharu Tanaka, Toyota (JP); Masami Kondo, Toyota (JP)

(73) Assignee: Toyota Jidosha Kabushiki Kaisha, Aichi-ken (JP)

(*) Notice: Subject to any disclaimer, the term of this patent is extended or adjusted under 35 U.S.C. 154(b) by 22 days.

(21) Appl. No.: 12/066,530

(22) PCT Filed: Jan. 29, 2007

(86) PCT No.: PCT/IB2007/000786

§ 371 (c)(1),
(2), (4) Date: Mar. 12, 2008

(87) PCT Pub. No.: WO2007/085968

PCT Pub. Date: Aug. 2, 2007

(65) Prior Publication Data

US 2008/0288156 A1 Nov. 20, 2008

(30) Foreign Application Priority Data

Jan. 30, 2006 (JP) ............................. 2006-020685

(51) Int. Cl.
*F02D 41/00* (2006.01)
*F02D 1/00* (2006.01)
(52) U.S. Cl. ................... 123/361; 123/396; 123/352
(58) Field of Classification Search ........... 123/361, 123/395, 396, 399, 351, 352; 701/102, 110, 701/114
See application file for complete search history.

(56) References Cited

U.S. PATENT DOCUMENTS

| 6,095,117 | A * | 8/2000 | Minowa et al. ............. 123/399 |
| 6,367,447 | B1  | 4/2002 | Palansky et al. |
| 6,615,797 | B2* | 9/2003 | Richard et al. ............. 123/352 |
| 6,915,782 | B2* | 7/2005 | Hanada et al. ............. 123/399 |
| 2005/0003926 | A1* | 1/2005 | Hanada et al. ................. 477/3 |
| 2007/0179016 | A1* | 8/2007 | Honda et al. .................. 477/97 |

FOREIGN PATENT DOCUMENTS

| DE | 196 19 324 A1 | 4/1997 |
| DE | 196 44 881 A1 | 4/1998 |
| JP | 9-112329 A | 4/1997 |

\* cited by examiner

*Primary Examiner*—John T Kwon
(74) *Attorney, Agent, or Firm*—Sughrue Mion, PLLC

(57) ABSTRACT

A target engine torque after an environmental correction is calculated by interpolating it between an environmentally corrected maximum engine torque and an environmentally corrected minimum engine torque such that a ratio of a nominal target engine torque between a nominal maximum engine torque and a nominal minimum engine torque under a predetermined environmental condition becomes essentially equal to a ratio of the target engine torque between the environmentally corrected maximum engine torque and the environmentally corrected minimum engine torque. The environmentally corrected maximum engine torque is obtained by multiplying the nominal maximum engine torque and a correction coefficient according to the environmental condition together.

9 Claims, 7 Drawing Sheets

ENGINE CONTROL APPARATUS AND ENGINE CONTROL METHOD

BACKGROUND OF THE INVENTION

1. Field of the Invention

The invention relates to an engine control apparatus and engine control method, and more particularly, to an engine control apparatus and engine control method which obtains a target engine torque based on an accelerator operation amount when controlling the driving force of a vehicle, and performs engine control so that the engine torque becomes equal to the target engine torque.

2. Description of the Related Art

A structure is known which obtains a target engine torque based on an accelerator operation amount when controlling the driving force of a vehicle, and performs engine control so that the engine output torque becomes equal to the target engine torque. In this kind of engine control, the engine torque characteristics are obtained beforehand under a predetermined environmental condition, and the engine torque is adjusted based on the target engine torque and the engine torque characteristics obtained beforehand.

However, when the environmental condition changes from the predetermined environmental condition, the actual engine torque characteristics also change such that when the engine torque is adjusted using the engine torque characteristics that were obtained under the predetermined environmental condition, the driving force that is achieved does not accurately reflect the driving force desired by the driver.

Regarding this point, Japanese Patent Application Publication No. JP-A-9-112329 proposes obtaining the maximum engine torque and the minimum engine torque that are actually able to be generated based on an environmental condition such as atmospheric pressure or intake air temperature, and then obtaining the target engine torque by interpolating it between the obtained maximum engine torque and the minimum engine torque.

More specifically, an interpolation block is applied with the target engine torque as a ratio (MPED) between the minimum engine torque and the maximum engine torque. The interpolation block obtains a target engine torque (MFAR) by interpolating it between the maximum engine torque (MMAX) and the minimum engine torque (MMIN) that are actually able to be generated, according to that ratio (MPED) (i.e., MFAR=MPED×(MMAX−MMIN)+MMIN). As a result, a target engine torque that corresponds to an accelerator operation by the driver can be set which reflects a change in the environment such as the atmospheric pressure or the intake air temperature or the like.

When there is a change in the environment, the maximum engine torque characteristic changes with respect to a change in engine speed in a manner unlike the maximum engine torque characteristic obtained in advance under the predetermined environmental condition. Therefore, as with the technology described in Japanese Patent Application Publication No. JP-A-9-112329, when the target engine torque is obtained, the engine torque characteristics to be used in obtaining the target engine torque become distorted with respect to the engine torque characteristics that were obtained beforehand under the predetermined environmental condition.

On the other hand, the control constants and the like that are used to control various devices for adjusting engine torque are applied based on the engine torque characteristics under the predetermined environmental condition. Therefore, the correlation between the engine torque characteristics used in obtaining the target engine torque and the engine torque characteristics behind controlling the devices for adjusting the engine torque is lost. As a result, accuracy in controlling the engine torque deteriorates, resulting in deterioration in drivability.

SUMMARY OF THE INVENTION

This invention aims to provide an engine control apparatus which is able to improve the accuracy of engine torque control and thus inhibit a deterioration in drivability by correctly setting a target engine torque even if an environmental condition such as the atmospheric pressure or intake air temperature changes.

A first aspect of the invention relates to an engine control apparatus which obtains a target engine torque based on an accelerator operation amount and performs engine control such that an output torque of an engine becomes equal to the target engine torque, which includes nominal calculating means, correcting means, and calculating means. The nominal calculating means calculates a nominal maximum engine torque, a nominal minimum engine torque and a nominal target engine torque based on characteristics of engine torque with respect to an engine speed and the accelerator operation amount obtained in advance under a predetermined environmental condition. The correcting means obtains an environmentally corrected (i.e., corrected according to a change in the environmental condition) maximum engine torque and an environmentally corrected minimum engine torque based on the environmental condition. The calculating means calculates the target engine torque by interpolating it between the environmentally corrected maximum engine torque and the environmentally corrected minimum engine torque such that the ratio of the nominal target engine torque between the nominal maximum engine torque and the nominal minimum engine torque becomes essentially equal to the ratio of the target engine torque between the environmentally corrected maximum engine torque and the environmentally corrected minimum engine torque. The correcting means obtains the environmentally corrected maximum engine torque by correcting the nominal maximum engine torque based on a correction coefficient according to the environmental condition.

With the engine control apparatus of the first aspect, the maximum engine torque for calculating the target engine torque is set by being environmentally corrected based on the nominal maximum engine torque. Therefore, the maximum engine torque characteristic after the environmental correction can be set reflecting the maximum engine torque characteristic obtained in advance under the predetermined environmental condition. Accordingly, the correlation between the engine torque characteristics used in obtaining the target engine torque after the environmental correction and the engine torque characteristics behind controlling the devices used to adjust the engine torque can be maintained. As a result, the engine torque is able to be controlled more accurately, thus inhibiting deterioration in drivability.

In the foregoing aspect, the calculating means may calculate the target engine torque by interpolating it between the environmentally corrected maximum engine torque and the environmentally corrected minimum engine torque such that the ratio of the difference between the nominal maximum engine torque and the nominal minimum engine torque to the difference between the nominal target engine torque and the nominal minimum engine torque becomes essentially equal to the ratio of the difference between the environmentally corrected maximum engine torque and the environmentally corrected minimum engine torque to the difference between the target engine torque and the environmentally corrected minimum engine torque.

In the foregoing structure, the correcting means may obtain the environmentally corrected maximum engine torque based on the product of the correction coefficient and the nominal maximum engine torque.

According to this structure, the maximum engine torque characteristic after the environmental correction can be changed in a similar fashion as the maximum engine torque characteristic obtained in advance under the predetermined environmental condition. Therefore, the correlation between the engine torque characteristics used in obtaining the target engine torque after the environmental correction and the engine torque characteristics behind controlling the devices used to adjust the engine torque can be easily maintained.

In the foregoing structure, the correcting means may obtain the environmentally corrected minimum engine torque by correcting the nominal minimum engine torque based on the correction coefficient according to the environmental condition.

Also in the foregoing structure, the target engine torque, the nominal maximum engine torque, and the nominal minimum engine torque may be applied as shaft torque, and the correcting means may include means for converting the nominal maximum engine torque to indicated torque, means for obtaining the correction coefficient according to the current environmental condition, means for calculating a maximum engine torque in indicated torque by multiplying the correction coefficient by the nominal maximum engine torque that was converted to indicated torque, and means for obtaining the environmentally corrected maximum engine torque by converting the maximum engine torque that was calculated in indicated torque to shaft torque.

According to this structure, the maximum engine torque can be preferably environmentally corrected based on the shaft torque that reflects auxiliary torque and engine friction torque.

Also, in the foregoing structure, the target engine torque, the nominal maximum engine torque, and the nominal minimum engine torque may be applied as shaft torque, and the correcting means may include means for converting the nominal minimum engine torque to indicated torque, means for obtaining the correction coefficient according to the current environmental condition, means for calculating a minimum engine torque in indicated torque by multiplying the correction coefficient by the nominal minimum engine torque that was converted to indicated torque, and means for obtaining the environmentally corrected minimum engine torque by converting the minimum engine torque that was calculated in indicated torque to shaft torque.

In the foregoing structure, the engine control apparatus may also include estimating means and changing means. The estimating means may estimate a maximum engine torque based on the environmental condition. The changing means may substitute the estimated maximum engine torque for the target engine torque, instead of using the target engine torque calculated by the calculating means, when the accelerator operation amount is greater than a fully open determination value.

According to the foregoing structure, the engine torque when the accelerator is operated so that it is fully open is compensated appropriately according to the environmental condition so the maximum value of the engine torque able to be output at that time can be set.

In the foregoing aspect, the engine control apparatus may also include estimating means for estimating a maximum engine torque and a minimum engine torque based on the environmental condition. Also, the correcting means may obtain the environmentally corrected minimum engine torque based on the estimated minimum engine torque.

Also, in the foregoing structure, the engine control apparatus may also include environmental correction prohibiting means. This environmental correction prohibiting means makes the target engine torque substantially equal to the nominal target engine torque by prohibiting the environmental correction of at least the nominal maximum engine torque according to a mode selection.

With this structure, according to the mode selection, even if the maximum engine torque fluctuates due to a change in the environment, the target engine torque can be increased in response to an accelerator operation according to the same characteristics as those under the predetermined environmental condition in the accelerator low opening amount and mid opening amount regions.

A second aspect of the invention relates to an engine control method which obtains a target engine torque based on an accelerator operation amount and performs engine control such that an output torque of an engine becomes equal to the target engine torque. This engine control method includes: calculating a nominal maximum engine torque, a nominal minimum engine torque and a nominal target engine torque based on characteristics of engine torque with respect to an engine speed and the accelerator operation amount obtained in advance under a predetermined environmental condition; obtaining an environmentally corrected maximum engine torque and an environmentally corrected minimum engine torque according to the environmental condition; calculating the target engine torque by interpolating the target engine torque between the environmentally corrected maximum engine torque and the environmentally corrected minimum engine torque such that the ratio of the difference between the nominal maximum engine torque and the nominal minimum engine torque to the difference between the nominal target engine torque and the nominal minimum engine torque becomes essentially equal to the ratio of the difference between the environmentally corrected maximum engine torque and the environmentally corrected minimum engine torque to the difference between the target engine torque and the environmentally corrected minimum engine torque; and obtaining the environmentally corrected maximum engine torque by correcting the nominal maximum engine torque based on a correction coefficient according to the environmental condition.

Accordingly, the engine control apparatus of the invention is able to improve the accuracy of engine torque control and thus inhibit deterioration in drivability by correctly setting a target engine torque even if an environmental condition such as the atmospheric pressure or intake air temperature changes.

BRIEF DESCRIPTION OF THE DRAWINGS

The foregoing and/or further objects, features and advantages of the invention will become apparent from the following description of example embodiments with reference to the accompanying drawings, in which the same or corresponding portions are denoted by the same reference numerals and wherein.

DETAILED DESCRIPTION OF THE EXAMPLE EMBODIMENTS

Figure 1:
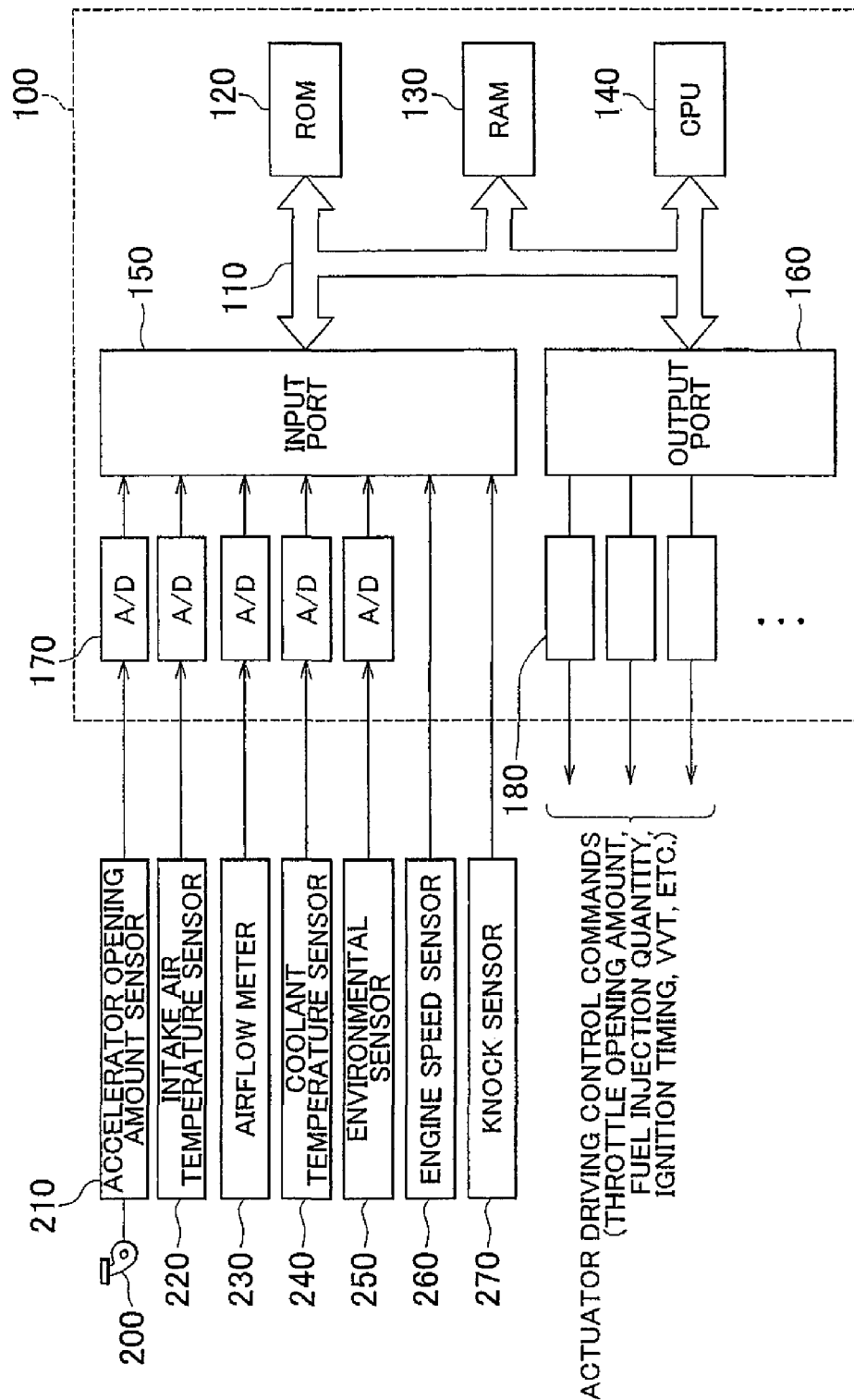
FIG. 1 is a block diagram of the configuration of an engine ECU which serves as the engine control apparatus according to an example embodiment of the invention.

Hereinafter, example embodiments of the invention will be described in detail with reference to the accompanying drawings. The same or corresponding portions in the drawings will be denoted by like reference numerals and descriptions thereof will essentially not be repeated.

FIG. 1 is a block diagram of the configuration of an engine ECU 100 which serves as the engine control apparatus according to an example embodiment of the invention.

Referring to FIG. 1, an engine ECU 100 is typically formed of a digital computer and includes ROM (Read Only Memory) 120, RAM (Random Access Memory) 130, a CPU (Central Processing Unit) 140, and an input port 150 and an output port 160, all of which are interconnected via a bi-directional bus 110.

An accelerator opening amount sensor 210 that generates an output voltage corresponding to a depression amount (i.e., an accelerator opening amount or accelerator operation amount) of an accelerator pedal 200 that is operated by a driver is connected to the accelerator pedal 200. An intake air temperature sensor 220 is provided in an intake air pipe, not shown, and outputs a voltage corresponding to the temperature of the intake air. An airflow meter 320 outputs a voltage corresponding to the amount of intake air introduced by a throttle valve, not shown, which is driven by an electric motor, also not shown. In this example embodiment, the opening amount of the throttle valve, not shown, is not directly controlled by the accelerator pedal 200, but rather based on an output signal from the engine ECU 100.

A coolant temperature sensor 240 is provided which outputs a voltage corresponding to the temperature of engine coolant. An environmental sensor 250 is also provided which detects the environment around the vehicle in which the engine is mounted (e.g., altitude, atmospheric pressure, gradient, outside air temperature, and the like). The output voltages from these sensors 210 to 250 are input to the input port 150 via an A/D converter 170.

An engine speed sensor 260 that generates an output pulse indicative of the engine speed is connected to the input port 150. Also, output from a knock sensor 270 that detects knocking in the engine is also input to the input port 150. In FIG. 1, only the sensors used in the environmental correction in the target engine torque setting calculation according to this example embodiment of the invention are representatively shown. Other sensors necessary for performing engine control are also actually provided, however.

The engine ECU 100 generates various kinds of control signals for controlling operation of the overall engine system based on signals from these sensors by executing predetermined programs. These control signals are generated as driving control commands for various actuators (e.g., throttle valve, fuel injection injectors, spark plug driving circuit, a variable valve timing (VVT) mechanism, and the like) for performing engine control via the output port 160 and signal driving circuits 180.

In this example embodiment of the invention, the engine ECU 100 controls the driving force of the vehicle according to a so-called torque demand method. That is, the engine ECU 100 sets a target engine torque that is based on the accelerator operation amount and controls the throttle opening amount and the ignition timing and the like so that the actual engine torque becomes equal to the target engine torque, as will be described below.

Next, the control structure of a routine for setting the target engine torque according to the example embodiment of the invention will be described with reference to FIG. 2. The engine ECU 100 sets the target engine torque according to the flowchart shown in FIG. 2 at predetermined time cycles.

In step S100 the engine ECU 100 detects the accelerator opening amount and the engine speed based on the outputs from the accelerator opening amount sensor 210 and the engine speed sensor 260. Then in step S110 the engine ECU 100 obtains a converted accelerator opening amount by non-linearly converting the accelerator opening amount according to a conversion characteristic shown in FIG. 3.

Figure 3:
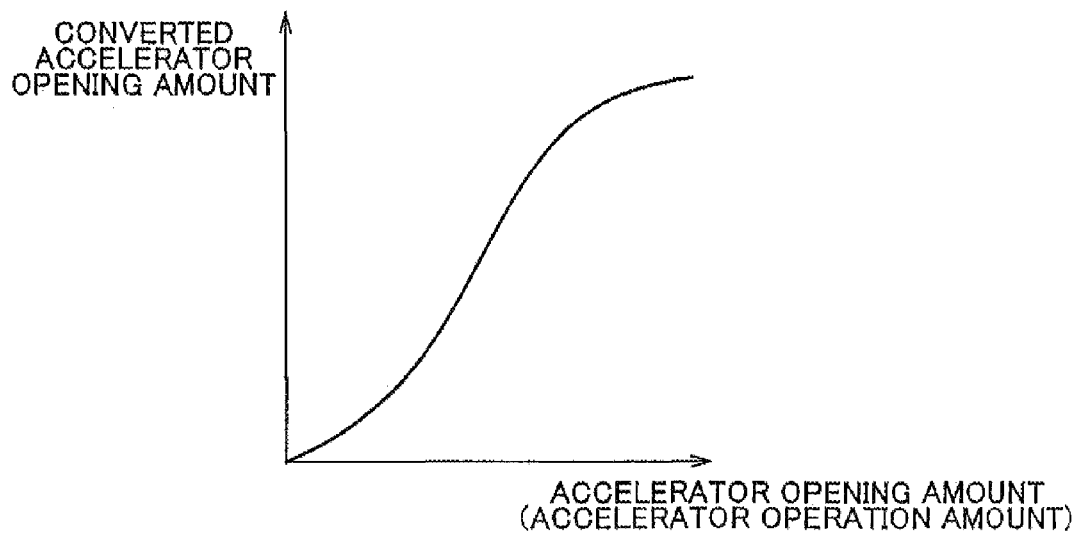
FIG. 3 is a conceptual diagram of an example of a conversion characteristic of an accelerator opening amount.

Referring to FIG. 3, the converted accelerator opening amount sets the output characteristic with respect to an accelerator operation. The nonlinear conversion characteristic between the accelerator operation amount and the converted accelerator opening amount is set to have a downward convex shape in the accelerator low opening amount region in order to improve the acceleration feeling when the driver depresses the accelerator pedal, and set to have a characteristic in which the output gradually reaches maximum output in the accelerator high opening amount region. The nonlinear conversion characteristic shown in FIG. 3 is set individually for each gear speed, not shown in the drawing. That is, the converted accelerator opening amount also corresponds to the accelerator operation amount.

Incidentally, in this example embodiment, the accelerator opening amount conversion shown in FIG. 3 is executed to improved drivability, but this accelerator opening amount conversion is not absolutely necessary in the control to set the target engine torque according to this invention.

Referring back to FIG. 2, in step S120 the engine ECU 100 calculates the maximum torque (hereinafter referred to as "nominal maximum engine torque"), the minimum torque (hereinafter referred to as "nominal minimum engine torque"), and the target torque (hereinafter referred to as "nominal target engine torque") under a predetermined environment based on the nominal characteristics (FIG. 4) obtained in advance under a predetermined environment, as well as the current engine speed and converted accelerator opening amount (S110).

The nominal torque characteristics are the engine torque characteristics obtained in advance under a predetermined environmental condition. Control constants and the like are also applied to control of the various devices for adjusting engine torque based on the engine torque characteristics under the predetermined environmental condition.

Figure 4:
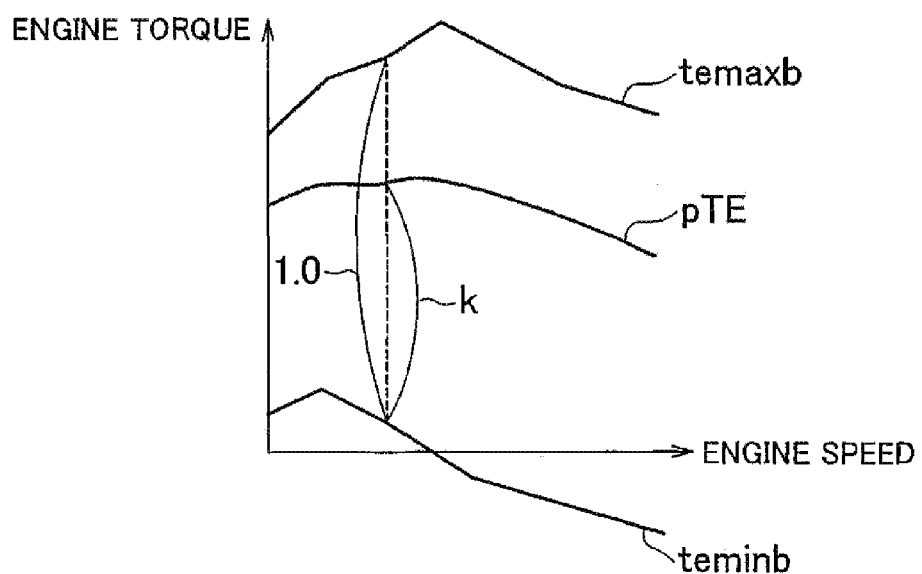
FIG. 4 is a conceptual diagram of an example structure of a nominal torque map showing the engine torque characteristics with respect to the converted accelerator opening amount and the engine speed under a predetermined environmental condition.

Referring to FIG. 4, the engine torque characteristics with respect to the engine speed and converted accelerator opening amount under the predetermined environmental condition are mapped out in a nominal torque map. Therefore, a nominal maximum engine torque temaxb corresponding to when the accelerator is operated so that it is fully open, a nominal minimum target engine torque teminb corresponding to when the accelerator is operated so that it is fully closed, and a nominal target engine torque pTE corresponding to the current converted accelerator opening amount are obtained from the current engine speed and accelerator operation amount. The nominal target engine torque pTE is set so that it is interpolated between the nominal minimum engine torque teminb and the nominal maximum engine torque temaxb. The nominal maximum engine torque temaxb, the nominal minimum engine torque teminb, and the nominal target engine torque pTE in FIG. 4 are output as shaft torque.

Here, the ratio of the nominal target engine torque pTE between the nominal minimum engine torque teminb and the nominal maximum engine torque temaxb, i.e., a target torque ratio k in the nominal characteristics, which is also shown in FIG. 4, can be expressed as shown in Expression (1) below.

$$k=(pTE-teminb)/(temaxb-teminb) \qquad (1)$$

Referring back to FIG. 2 again, in step S130 the engine ECU 100 calculates the estimated maximum torque and the estimated minimum torque able to currently be generated reflecting the change in the environment.

In step S130, the engine ECU 100 obtains a current estimated minimum engine torque dtemin and a current estimated maximum engine torque dtemax of the engine based on the engine state and an environmental condition such as the atmospheric pressure, the intake air temperature or the like. The environmental condition can be obtained from the intake air temperature sensor 220 or the environmental sensor 250 shown in FIG. 1, for example. The atmospheric pressure can also be estimated by comparing the current intake air amount measured by the airflow meter 230 while the throttle valve is open a predetermined amount with a reference intake air amount (when on level ground) while the throttle valve is open at the same predetermined amount.

The ISC (Idle Speed Control) throttle opening amount, the engine speed, the ignition timing, the knocking learning, the variable valve timing (VVT) state, and the variable intake pipe state and the like are reflected as the engine state in the calculation of the estimated minimum engine torque dtemin. Also, the fully open throttle opening amount, the engine speed, the ignition timing, the knocking learning, the variable valve timing (VVT) state, and the variable intake pipe state and the like are reflected as the engine state in the calculation of the estimated maximum engine torque dtemax.

In step S130, the engine ECU 100 calculates the estimated minimum engine torque dtemin and the estimated maximum engine torque dtemax by subtracting the engine friction torque and the auxiliary torque from the thus obtained minimum and maximum engine torques, and converting the differences to axial torque.

Figure 5:
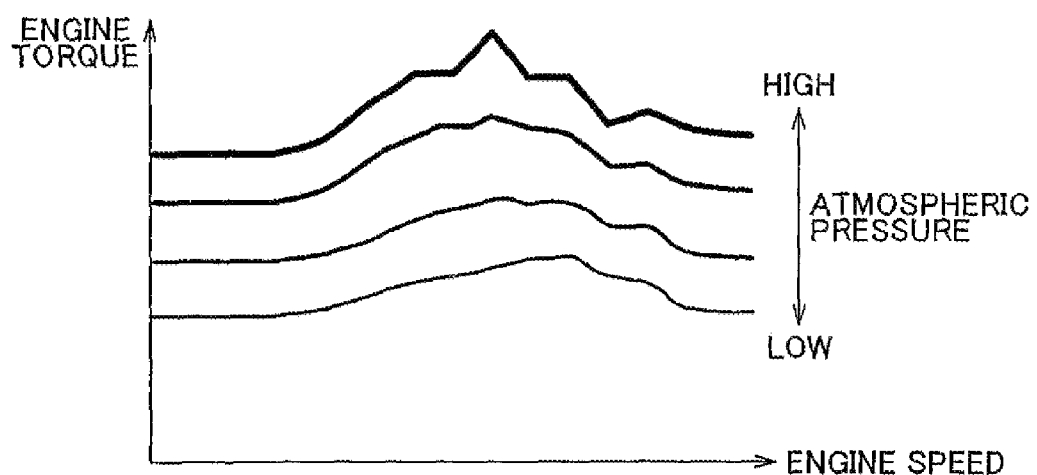
FIG. 5 is a conceptual diagram illustrating an example of the affect of atmospheric pressure on the maximum engine torque.

Here, the engine torque characteristics change when the environmental condition, represented by atmospheric pressure, changes. For example, the maximum engine torque that can be output decreases when there is a decrease in atmospheric pressure, as shown in FIG. 5. At this time, the maximum engine torque characteristic corresponding to the engine speed is such that the nominal torque characteristic under the predetermined environmental condition is distorted. Therefore, the nominal torque characteristic shown in FIG. 4 is distorted also with regard to the estimated maximum engine torque dtemax obtained in step S130.

Referring back to FIG. 2, in step S140, the engine ECU 100 determines whether the converted accelerator opening amount that was obtained in step S110 is equal to or less than the fully open determination value.

When the determination in step S140 is YES, i.e., when the accelerator is not yet fully open, the engine ECU 100 calculates the final target engine torque dTE according to step S160 and step S170 below.

In step S160, the engine ECU 100 performs an environment correction on the nominal maximum torque and the nominal minimum torque to obtain an environmentally corrected maximum engine torque temax# and an environmentally corrected minimum engine torque temin#. The term "environmentally corrected" in this specification refers to a correction that has been made to account for a change in an environmental condition.

Figure 6:
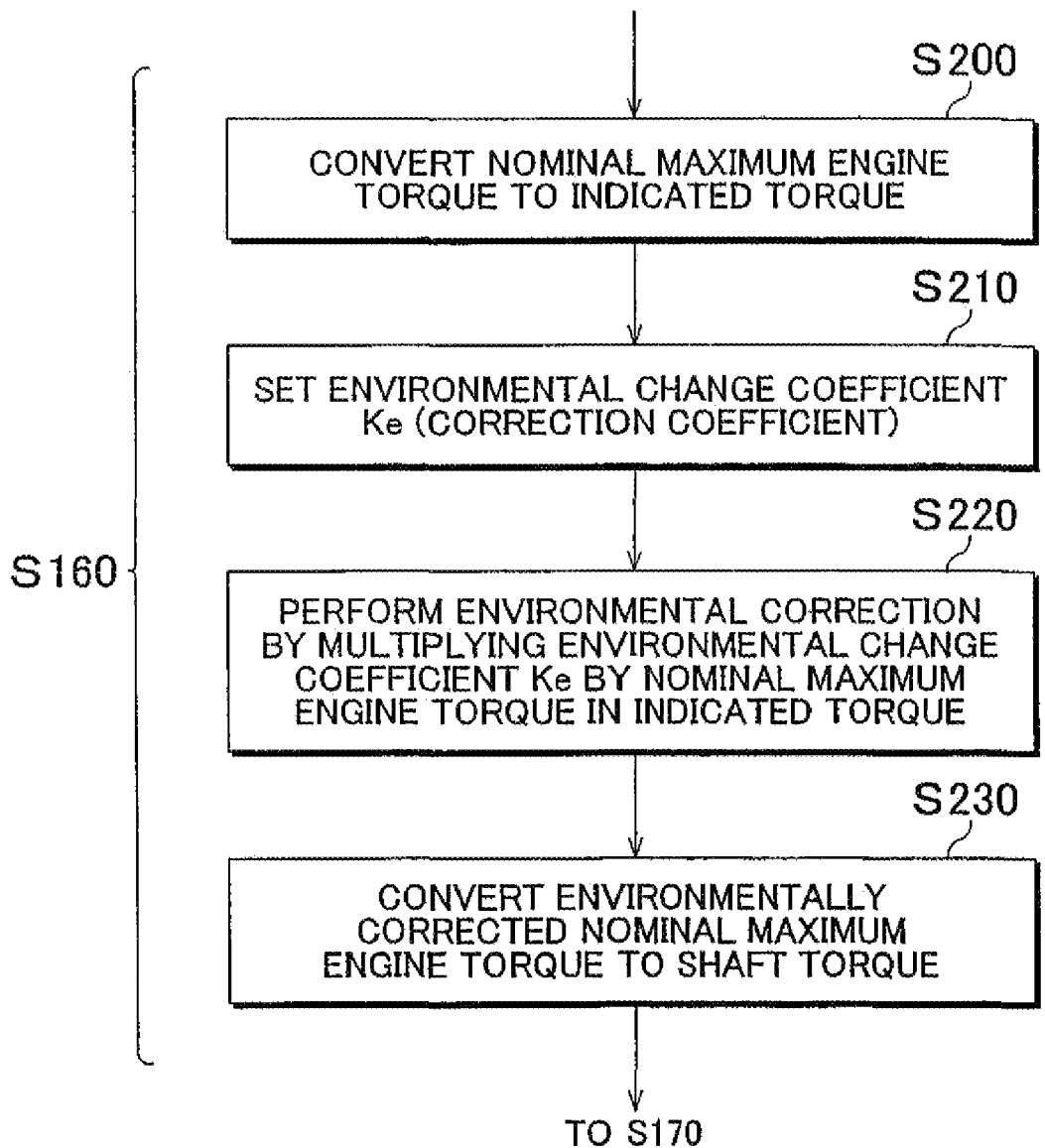
FIG. 6 is a flowchart illustrating the details of the process in step S160 in FIG. 2.

Step S160 is formed of steps S200 to S230, which are shown in FIG. 6.

In step S200, the engine ECU 100 converts the nominal maximum engine torque obtained in step S120 to indicated torque. Here, the indicated torque is a torque that is actually generated in an engine cylinder, and has relation with a shaft torque as shown in Expression below.

shaft torque=indicated torque−engine friction torque−auxiliary torque

The engine ECU 100 then obtains an environmental change coefficient (i.e., a correction coefficient) Ke according to the environmental condition in step S210. Here, the environmental change coefficient Ke is calculated according to Expression (2) below, for example.

$$Ke=Kpa \times Ktha \qquad (2)$$

In Expression (2), the atmospheric pressure correction coefficient Kpa is set according to the atmospheric pressure. For example, the atmospheric pressure correction coefficient Kpa may be set based on the output of the environmental sensor 250, or it may be learned based on a comparison between the estimated intake air amount and the actual intake air amount that was measured by the airflow meter 230. In this case, learning is performed so that the atmospheric pressure correction coefficient Kpa decreases when the estimated intake air amount is greater than the actual intake air amount, and increases when the estimated intake air amount is less than the actual intake air amount. Here, the estimated intake air amount can be calculated based on the engine state, e.g., the throttle opening amount, the engine speed, the variable valve timing (VVT), and the variable intake pipe state.

An intake air temperature correction coefficient Ktha can be obtained by, for example, referencing a preset map according to the intake air temperature detected by the intake air temperature sensor 220 and the engine coolant temperature that is detected by the coolant temperature sensor 240.

As described above, in order to reflect the change in engine torque due to the change in the environmental condition, the environmental change coefficient Ke is set to be greater than 1.0 when the intake air temperature is relatively low and the atmospheric pressure is relatively high compared to the predetermined environmental condition, and conversely set to be less than 1.0 when the intake air temperature is high and the atmospheric pressure is low with respect to the predetermined environmental condition.

In step S220, the engine ECU 100 obtains the environmentally corrected maximum engine torque in indicated torque by multiplying the nominal maximum engine torque that was converted to indicated torque (S200) by the environmental change coefficient Ke. Further, in step S230, the environmentally corrected maximum engine torque temax# in indicated torque is obtained by subtracting the engine friction torque and the auxiliary torque from the maximum engine torque obtained in step S220 and converting the obtained difference to shaft torque. As a result, the maximum engine torque can be set appropriately taking into account the engine friction torque and auxiliary torque. Although not shown in the drawing, the environmentally corrected minimum engine torque temin# is obtained in the same way by a shaft torque conversion.

Referring again back to FIG. 2, in step S170, the engine ECU 100 calculates the environmentally corrected final target engine torque dTE based on the target torque ratio k on the nominal characteristic in step S120 and the environmentally corrected maximum engine torque temax# and the environmentally corrected minimum engine torque temin# obtained in step S160.

On the other hand, when the determination in step S140 is NO, i.e., when the accelerator is fully open, the engine ECU 100 substitutes the estimated maximum engine torque dtemax obtained in step S130 for the final target engine torque dTE (i.e., dTE=dtemax). As a result, the engine output torque when the accelerator is fully open can be compensated with a value that reflects the change in the environment at that time.

Here, the details of the calculation of the environmentally corrected target engine torque dTE will be described with reference to FIG. 7.

Figure 7:
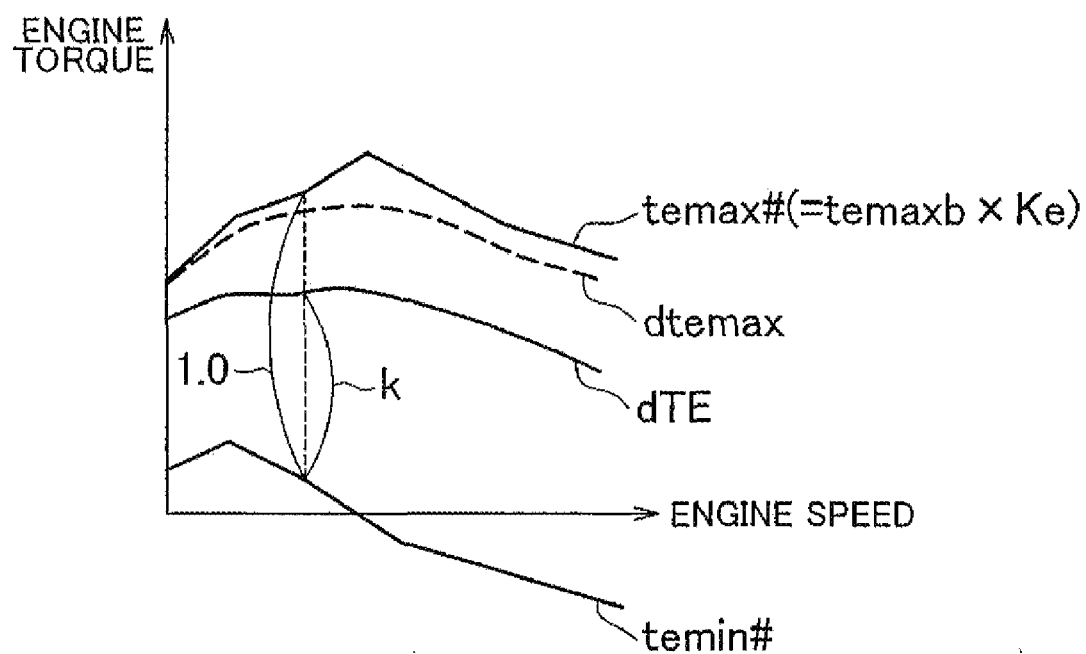
FIG. 7 is a conceptual diagram showing the details of the calculation of the environmentally corrected target engine torque.

Referring to FIG. 7, the environmentally corrected maximum engine torque temax# is obtained by multiplying the nominal maximum engine torque temaxb by the environmental change coefficient Ke. Therefore, while the estimated maximum engine torque dtemax according to the environmental condition has different characteristics than the nominal maximum engine torque temaxb in FIG. 4 with respect to a change in the engine speed, the environmentally corrected maximum engine torque temax# according to the environmental condition has the same characteristics as the nominal maximum engine torque temaxb in FIG. 4 with respect to the change in the engine speed. That is, the environmentally corrected maximum engine torque temax# is obtained by similarly transforming the nominal maximum engine torque temaxb so that it increases or decreases according to the environmental condition at that time.

The environmentally corrected minimum engine torque temin# is obtained by multiplying the environmental change coefficient Ke, for example, by the nominal minimum engine torque teminb shown in FIG. 4, for example (i.e., temin#=Ke×teminb). Alternatively, the environmentally corrected minimum engine torque temin# may also be calculated by providing an environmental change coefficient Ke' which is independent from the environment correction of the nominal maximum engine torque, and multiplying that independent environmental change coefficient Ke' by the nominal minimum engine torque (i.e., temin#=Ke'×teminb). Also, the environmentally corrected minimum engine torque temin# may be set based on the estimated minimum engine torque dtemin.

The final target engine torque dTE is set according to Expression (3) below so that it is interpolated such that the ratio of the difference between the target engine torque dTE and the environmentally corrected minimum engine torque temin# to the difference between the environmentally corrected maximum engine torque temax# and the environmentally corrected minimum engine torque temin# becomes equal to the target torque ratio k in the nominal characteristics.

$$dTE=(temax\#-temin\#)\times k+temin\# \qquad (3)$$

As shown in Expression (1), k=(pTE−teminb)/(temaxb−teminb). The engine ECU 100 then generates an actuator driving control command to execute engine control of the throttle opening, the ignition timing, and the like to realize the final target engine torque dTE set in step S150 or step S170 in FIG. 2.

According to the type of control structure described above, even if the engine torque (estimated maximum torque/minimum torque) able to be generated changes due to a change in the environment, the target engine torque can be set maintaining engine torque characteristics similar to those under the predetermined environmental condition. Accordingly, the correlation between the engine torque characteristics used in obtaining the target engine torque and the engine torque characteristics that are the basis for controlling devices for adjusting the engine torque can be maintained. As a result, the accuracy with which the engine torque can be controlled is improved, thus inhibiting a deterioration of drivability.

Furthermore, when the accelerator is operated so that it is fully open, the target engine torque can be set so that maximum engine torque, which reflects the current environmental condition is output.

Figure 2:
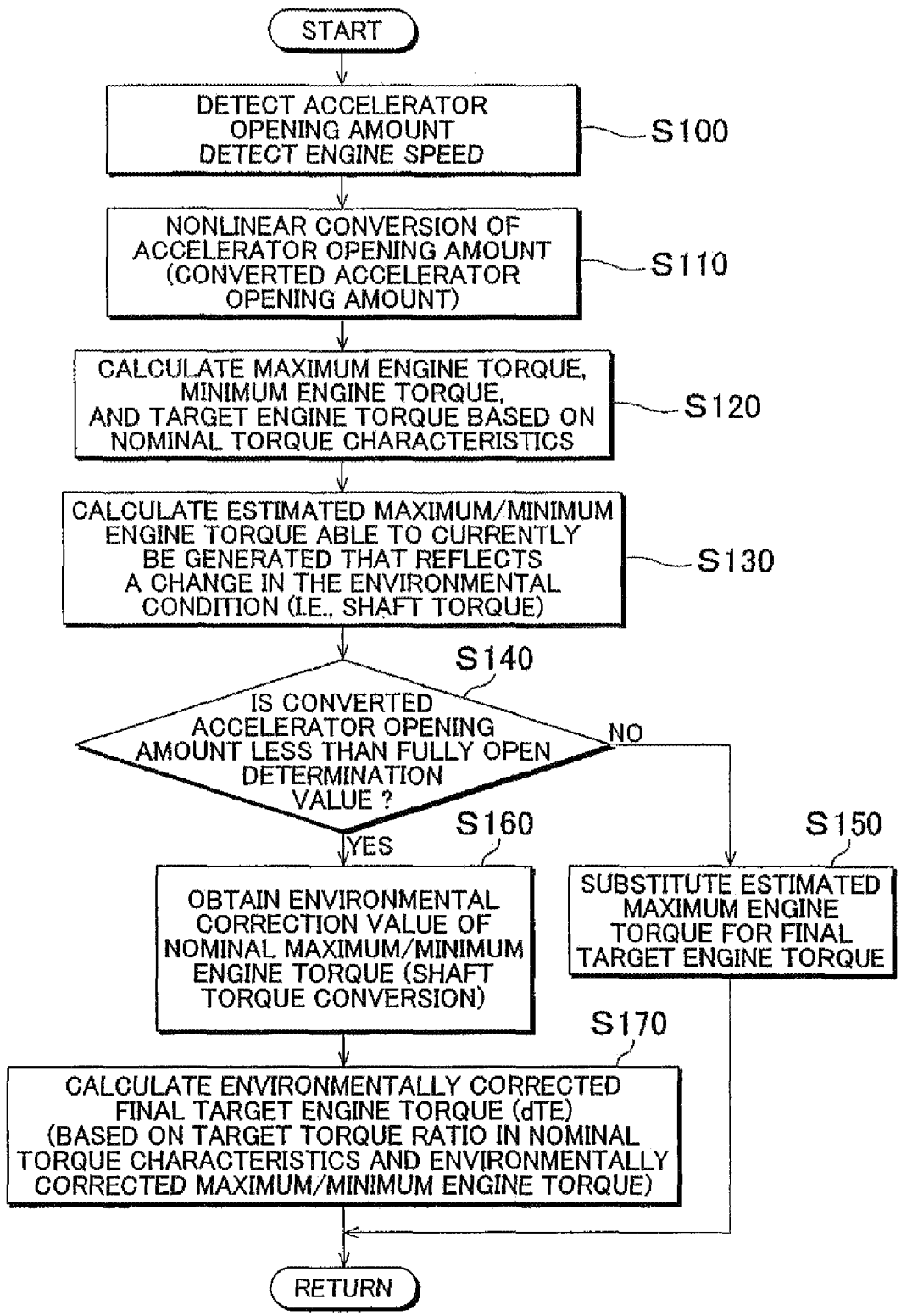
FIG. 2 is a flowchart illustrating the control structure of a routine for setting the target engine torque according to the example embodiment of the invention.

In the flowchart shown in FIG. 2, step S120 can be regarded as "nominal calculating means" of the invention, step S160 can be regarded as "correcting means" of the invention, and step S170 can be regarded as "calculating means" of the invention. Also, step S130 can be regarded as "estimating means" of the invention, and step S150 can be regarded as "changing means" of the invention.

MODIFIED EXAMPLE OF THE EXAMPLE EMBODIMENT

Figure 8:
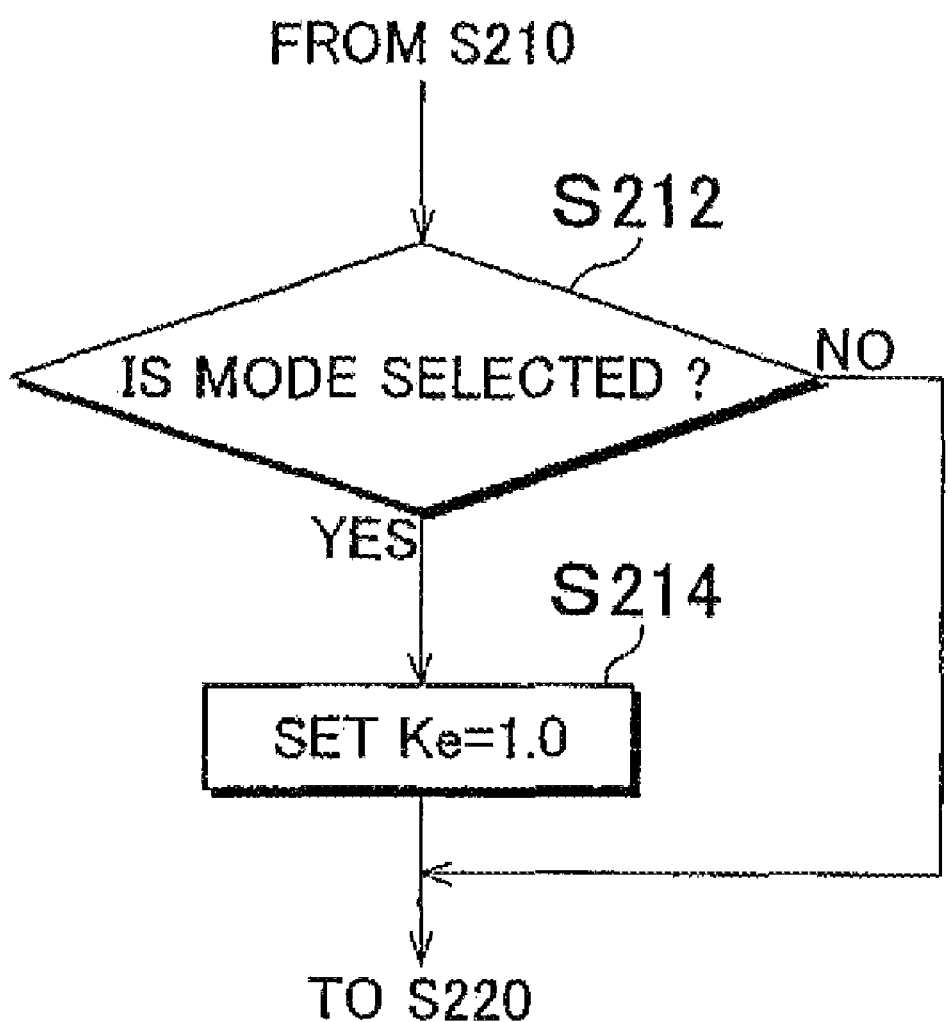
FIG. 8 is a flowchart showing how the environment change coefficient is set according to a modified example of the example embodiment of the invention.

FIG. 8 is a flowchart illustrating how the environmental change coefficient Ke is set according to a modified example of the example embodiment of the invention.

Referring to FIG. 8, according to this modified example of the example embodiment, the engine ECU 100 performs steps S212 and S214 between steps S210 and S220 in FIG. 6.

After setting the environmental change coefficient Ke in step S210, the engine ECU 100 then determines in step S212 whether a mode in which the environmental correction is prohibited is selected. When that mode is not selected (i.e., when the determination is NO in step S212), the environmental change coefficient Ke obtained in step S210 is maintained.

On the other hand, when the determination is YES in step S212, i.e., when that mode is selected, the engine ECU 100 forcibly sets the environmental change coefficient Ke to 1.0 in step S214.

As a result, even if the maximum engine torque able to be output fluctuates due to a change in the environment, in the accelerator low opening amount and mid opening amount regions, the characteristics are the same as they are under the predetermined environmental condition so the target engine torque is increased according to an accelerator operation, thus inhibit deterioration in drivability. If the environmental change coefficient Ke is fixed at 1.0, however, an area where the torque is undetectable is generated in the high opening amount region starting near the accelerator fully open region. Therefore, the mode is preferably selected manually by the driver.

Step S214 in FIG. 8 corresponds to "environmental correction prohibiting means".

Also, in the example embodiment of the invention, the environmentally corrected maximum (minimum) engine torque is obtained by multiplying the nominal maximum (minimum) torque by the correction coefficient in order to perform an environmental correction by a simpler computation. However, even with a control structure that performs an environmental correction by adding or subtracting a correction amount according to the environmental condition to or from the nominal maximum (minimum) torque, the target engine torque can be set maintaining the correlation with the engine torque characteristics under the predetermined environmental condition.

The example embodiments disclosed herein are in all respects merely examples and should in no way be construed as limiting. The scope of the invention is indicated not by the foregoing description but by the scope of the claims for patent, and is intended to include all modifications that are within the scope and meanings equivalent to the scope of the claims for patent.

The invention claimed is:

1. An engine control apparatus which obtains a target engine torque based on an accelerator operation amount and performs engine control such that an output torque of an engine becomes equal to the target engine torque, comprising:
    a nominal calculating portion that calculates a nominal maximum engine torque, nominal minimum engine torque and a nominal target engine torque based on characteristics of engine torque with respect to an engine speed and the accelerator operation amount obtained in advance under a predetermined environmental condition;
    a correcting portion that obtains an environmentally corrected maximum engine torque and an environmentally corrected minimum engine torque according to the environmental condition; and
    a calculating portion that calculates the target engine torque by interpolating the target engine torque between the environmentally corrected maximum engine torque and the environmentally corrected minimum engine torque such that the ratio of the difference between the nominal maximum engine torque and the nominal minimum engine torque to the difference between the nominal target engine torque and the nominal minimum engine torque becomes essentially equal to the ratio of the difference between the environmentally corrected maximum engine torque and the environmentally corrected minimum engine torque to the difference between the target engine torque and the environmentally corrected minimum engine torque,
    wherein the correcting portion obtains the environmentally corrected maximum engine torque by correcting the nominal maximum engine torque based on a correction coefficient according to the environmental condition.

2. The engine control apparatus according to claim 1, wherein the correcting portion obtains the environmentally corrected maximum engine torque based on the product of the correction coefficient and the nominal maximum engine torque.

3. The engine control apparatus according to claim 1, wherein the correcting portion obtains the environmentally corrected minimum engine torque by correcting the nominal minimum engine torque based on the correction coefficient according to the environmental condition.

4. The engine control apparatus according to claim 1, wherein the target engine torque, the nominal maximum engine torque, and the nominal minimum engine torque are applied as shaft torque; and the correcting portion converts the nominal maximum engine torque to indicated torque, obtains the correction coefficient according to the current environmental condition, calculates a maximum engine torque in indicated torque by multiplying the correction coefficient by the nominal maximum engine torque that was converted to indicated torque, and obtains the environmentally corrected maximum engine torque by converting the maximum engine torque that was calculated in indicated torque to shaft torque.

5. The engine control apparatus according to claim 1, wherein the target engine torque, the nominal maximum engine torque, and the nominal minimum engine torque are applied as shaft torque; and the correcting portion converts the nominal minimum engine torque to indicated torque, obtains the correction coefficient according to the current environmental condition, calculates a minimum engine torque in indicated torque by multiplying the correction coefficient by the nominal minimum engine torque that was converted to indicated torque, and obtains the environmentally corrected minimum engine torque by converting the minimum engine torque that was calculated in indicated torque to shaft torque.

6. The engine control apparatus according to claim 1, further comprising:
    an estimating portion that estimates a maximum engine torque based on the environmental condition; and
    a changing portion that changes the estimated maximum engine torque, instead of the target engine torque calculated by the calculating portion, to the target engine torque when the accelerator operation amount is greater than a fully open determination value.

7. The engine control apparatus according to claim 1, further comprising:
    an estimating portion that estimates a maximum engine torque and a minimum engine torque based on the environmental condition,
    wherein the correcting portion obtains the environmentally corrected minimum engine torque based on the estimated minimum engine torque.

8. The engine control apparatus according to claim 1, further comprising:
    an environmental correction prohibiting portion that makes the target engine torque substantially equal to the nominal target engine torque by prohibiting the environmental correction of at least the nominal maximum engine torque according to a mode selection.

9. An engine control method which obtains a target engine torque based on an accelerator operation amount and performs engine control such that an output torque of an engine becomes equal to the target engine torque, characterized by comprising:
    calculating a nominal maximum engine torque, a nominal minimum engine torque and a nominal target engine torque based on characteristics of engine torque with respect to an engine speed and the accelerator operation amount obtained in advance under a predetermined environmental condition;
    obtaining an environmentally corrected maximum engine torque and an environmentally corrected minimum engine torque according to the environmental condition;
    calculating the target engine torque by interpolating the target engine torque between the environmentally corrected maximum engine torque and the environmentally corrected minimum engine torque such that the ratio of the difference between the nominal maximum engine torque and the nominal minimum engine torque to the difference between the nominal target engine torque and the nominal minimum engine torque becomes essentially equal to the ratio of the difference between the environmentally corrected maximum engine torque and the environmentally corrected minimum engine torque to the difference between the target engine torque and the environmentally corrected minimum engine torque; and obtaining the environmentally corrected maximum engine torque by correcting the nominal maximum engine torque based on a correction coefficient according to the environmental condition.

* * * * *